UNITED STATES PATENT OFFICE.

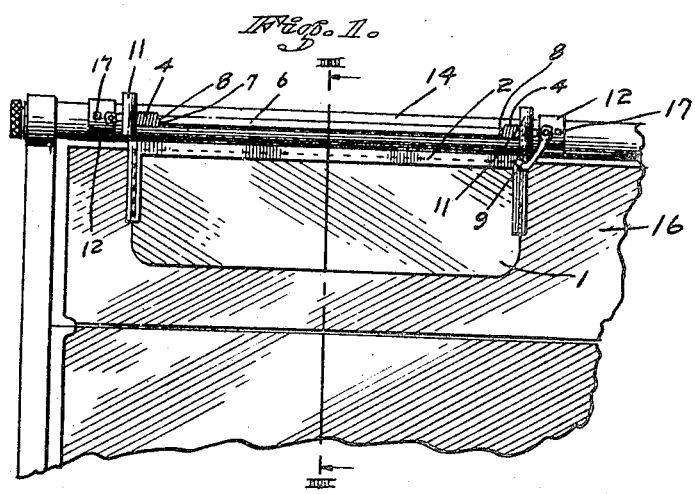
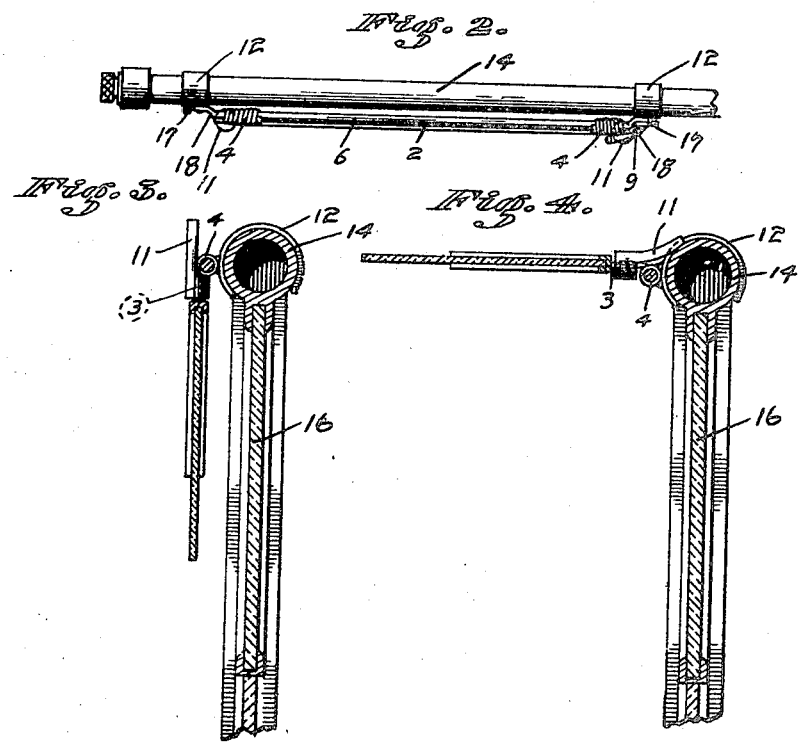

THOMAS J. TREICHEL, OF SAN FRANCISCO, CALIFORNIA.

ADJUSTABLE SUN AND LIGHT DIFFUSER.

1,417,218.　　　　Specification of Letters Patent.　　Patented May 23, 1922.

Application filed March 16, 1921. Serial No. 452,831.

*To all whom it may concern:*

Be it known that I, THOMAS J. TREICHEL, a citizen of the United States, and a resident of San Francisco, county of San Francisco, and State of California, have invented a new and useful Adjustable Sun and Light Diffuser, of which the following is a specification.

The present invention relates to improvements in light dimming means for automobiles and its principal object is to provide an adjustable sun and light diffuser that will shield the eyes of the driver from the glaring light of the sun or of an approaching automobile, that may be conveniently attached to the windshield of an automobile, may be swung into its proper place in an instant and locked in said place and that will automatically swing back upon the release of said locking device into a position where it does not obstruct the view of the driver.

I attain these objects by means of the mechanism illustrated in the accompanying drawing, in which Figure 1 represents a front view of my device attached to the windshield of an automobile, looking at it from the driver's seat; Figure 2 a plan view of said device; Figure 3 a cross-section along line 3—3 of Figure 1 and Figure 4 a cross-section of the same device along the same line, showing the device when not in use.

Referring to the drawing more particularly, a thin plate of celluloid (1) of any desired color adapted to shield the eyes of the driver from the light of the sun or of an approaching automobile is held in a frame (2). The frame lines only the top and parts of the sides of the celluloid, the bottom being unframed, so that the bottom does not present any obstacle to the view of the driver. The frame is supported by two wires (3) extending into the upper edges of the frame, which wires are the extensions of two coiled springs (4) wound on a rod (6) and prevented from rotating on said rod by the fact that one end (7) of said spring is led into a hole (8) in said rod. The tendency of said springs is to unwind on said rod and to consequently swing the frame and the celluloid around the rod, that is, from the position indicated in Figure 3 to the position indicated in Figure 4 and beyond that position. To control this tendency of the spring I provide two stops, a rigid one (9) and a flexible one (11), which will be referred to later.

The ends of the rod (6) are rigidly fastened to two clamps (12) adapted to be slipped over the top member (14) of the frame of the windshield (16) to be held there either by their own tension or by means of the set-screws (17). As is shown at (18), there is a small dent at either end of the rod, whereby the plane of the rod is slightly removed from the top member of the windshield.

At the right hand side of the drawing in Figure 1 is shown the stop (9) which consists of a hook pivotally fastened to one of the clamps (12). When the light diffuser is in use said hook can be slipped in front of the diffuser and thereby lock it. To unlock the diffuser the driver need only push the hook aside and the springs will cause the diffuser to swing upward around the rod (6) until it is again stopped by the stops (11). These are cylindrical bodies of slightly flexible material provided with an axial hole and reduced to a semi-circular cross-section through part of their lengths. Their lower parts, of circular cross-section, are slipped on the two wires (3) while their upper parts, of semi-circular cross-section, extend upward to a level corresponding to the top of the top member of the windshield. It will thus be seen that when the celluloid, after being released from lock (9), flops upward it will be stopped from going much beyond a horizontal position by the upper parts of the flexible stops coming in contact with the top of the windshield or the upper edge of the front bar of the automobile top, whichever the case may be.

I claim:

1. A wind shield attachment comprising a rod secured to the top member of the wind shield in parallel relation to the same, a plate, spring means associated with the rod supporting the plate and tending to revolve the same around the rod and flexible means actuated by the spring means for limiting the revolving motion of the plate.

2. A wind shield attachment comprising a rod secured to the top member of the wind shield in parallel relation to the same, a plate, spring means associated with the rod supporting the plate and tending to revolve the same around the rod and flexible means actuated by the spring means and co-operating with the top member of the wind shield for limiting the revolving motion of the plate.

THOMAS J. TREICHEL.